US011818587B2

(12) United States Patent
Yoshida et al.

(10) Patent No.: US 11,818,587 B2
(45) Date of Patent: Nov. 14, 2023

(54) COMMUNICATION RANGE CONTROL DEVICE, METHOD, AND PROGRAM

(71) Applicant: NIPPON TELEGRAPH AND TELEPHONE CORPORATION, Tokyo (JP)

(72) Inventors: Masahiro Yoshida, Musashino (JP); Koya Mori, Musashino (JP); Tomohiro Inoue, Musashino (JP); Hiroyuki Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 187 days.

(21) Appl. No.: 17/289,583

(22) PCT Filed: Oct. 9, 2019

(86) PCT No.: PCT/JP2019/039809
§ 371 (c)(1),
(2) Date: Apr. 28, 2021

(87) PCT Pub. No.: WO2020/090389
PCT Pub. Date: May 7, 2020

(65) Prior Publication Data
US 2022/0014931 A1 Jan. 13, 2022

(30) Foreign Application Priority Data
Nov. 1, 2018 (JP) .................................. 2018-206873

(51) Int. Cl.
*H04W 16/18* (2009.01)
*H04W 24/02* (2009.01)
(52) U.S. Cl.
CPC ........... *H04W 16/18* (2013.01); *H04W 24/02* (2013.01)

(58) Field of Classification Search
CPC ........... H04L 67/1008; H04L 67/1021; H04W 16/18; H04W 24/02
See application file for complete search history.

(56) References Cited

U.S. PATENT DOCUMENTS 5,630,129 A * 5/1997 Wheat .................. G06F 9/5083
712/21
6,574,477 B1 * 6/2003 Rathunde .......... H04W 28/0808
455/561

(Continued)

FOREIGN PATENT DOCUMENTS

CN 102217333 A 10/2011
CN 108282800 A * 7/2018 ............ H04W 24/02

(Continued)

OTHER PUBLICATIONS

M. Bouet and V. Conan, "Geo-partitioning of MEC Resources", in ACM SIGCOMM 2017 Workshop on Mobile Edge Computing, 2017.

(Continued)

*Primary Examiner* — Matthew C Sams
(74) *Attorney, Agent, or Firm* — Harness, Dickey & Pierce, P.L.C.

(57) ABSTRACT

When data transmitted from devices is processed by servers in a shared manner, the data is processed in a constantly stable manner when the devices move. Based on information indicating installation positions and processing capabilities of the servers, information on installation positions of base stations, and acquired location information of the devices, the coverage area control apparatus performs, at a certain time interval, a clustering calculation for obtaining an optimum coverage area for the servers that satisfies the requirements that the communication distances between the servers and the respective devices be minimized and the servers not be overloaded. Based on the information indicating the (Continued)

optimum coverage area obtained by the clustering calculation, assignments of the base stations to the servers are updated.

6 Claims, 7 Drawing Sheets

(56) References Cited

U.S. PATENT DOCUMENTS

| | | | | |
|---|---|---|---|---|
| 7,185,067 | B1* | 2/2007 | Viswanath | H04W 28/0842 |
| | | | | 709/219 |
| 7,428,588 | B2* | 9/2008 | Berstis | H04W 4/029 |
| | | | | 709/224 |
| 7,437,348 | B1* | 10/2008 | Wyett | G06Q 10/06 |
| 7,747,239 | B1* | 6/2010 | Sennett | H04W 4/14 |
| | | | | 455/414.3 |
| 8,761,786 | B2* | 6/2014 | Monnes | H04W 8/186 |
| | | | | 455/450 |
| 9,781,607 | B2* | 10/2017 | Rath | H04L 41/145 |
| 10,440,096 | B2* | 10/2019 | Sabella | H04W 28/0205 |
| 10,440,559 | B2* | 10/2019 | Ye | H04W 8/08 |
| 10,791,168 | B1* | 9/2020 | Dilley | H04L 67/288 |
| 2002/0009079 | A1* | 1/2002 | Jungck | H04L 63/0263 |
| | | | | 370/386 |
| 2002/0065938 | A1* | 5/2002 | Jungck | H04L 47/19 |
| | | | | 709/246 |
| 2005/0021863 | A1* | 1/2005 | Jungck | H04L 47/19 |
| | | | | 709/246 |
| 2005/0246711 | A1* | 11/2005 | Berstis | H04W 4/029 |
| | | | | 718/105 |
| 2006/0075139 | A1* | 4/2006 | Jungck | H04L 63/0236 |
| | | | | 709/245 |
| 2009/0262741 | A1* | 10/2009 | Jungck | H04L 47/24 |
| | | | | 370/392 |
| 2009/0275341 | A1 | 11/2009 | Monnes et al. | |
| 2010/0061273 | A1 | 3/2010 | Kurokochi | |
| 2010/0274885 | A1* | 10/2010 | Yoo | H04L 67/1008 |
| | | | | 709/224 |
| 2011/0212716 | A1 | 9/2011 | Hosono | |
| 2017/0024259 | A1* | 1/2017 | Mecklin | H04L 69/24 |
| 2018/0183855 | A1* | 6/2018 | Sabella | H04W 52/0264 |
| 2018/0242204 | A1* | 8/2018 | Zhu | H04W 76/11 |
| 2018/0349203 | A1 | 12/2018 | Ohta et al. | |

FOREIGN PATENT DOCUMENTS

| | | | | |
|---|---|---|---|---|
| CN | 110601992 | A * | 12/2019 | H04L 47/125 |
| CN | 111866949 | A * | 10/2020 | G06K 9/6218 |
| EP | 2007088 | A2 * | 12/2008 | H04L 29/12009 |
| WO | WO-2008142776 | A1 | 11/2008 | |
| WO | WO-2010016578 | A1 | 2/2010 | |
| WO | WO-2010110187 | A1 | 9/2010 | |
| WO | WO-2017094246 | A1 | 6/2017 | |

OTHER PUBLICATIONS

J. MacQueen (1967). "Some methods for classification and analysis of multivariate observations", Proc. Fifth Berkeley Symp. on Math. Statist, and Prob., vol. 1 (Univ. of Calif. Press, 1967), p. 281-297.
International Search Report issued in PCT/JP2019/039809, dated Oct. 12, 2019.

* cited by examiner

COMMUNICATION RANGE CONTROL DEVICE, METHOD, AND PROGRAM

CROSS-REFERENCE TO RELATED APPLICATIONS

This is a U.S. national phase application under 35 USC 371 of international application PCT/JP2019/039809, filed on Oct. 9, 2019, which claims priority to Japanese patent application No. 2018-206873, filed on Nov. 1, 2018. The entire disclosures of the above applications are incorporated herein by reference.

FIELD

The present invention relates to, for example, a coverage area control apparatus, a coverage area control method, and a coverage area control program used in a system in which data detected by a sensor mounted on a moving object is processed by a plurality of server apparatuses that are geographically dispersed in a shared manner.

BACKGROUND

In recent years, with the widespread use of the Internet of Things (IoT), data collection and analysis using various sensors have been advanced in fields such as manufacturing, automotive (autonomous driving support), and agriculture. In such a system, data generated by devices such as sensors is collected onto cloud servers via networks and utilized for applications. There are an enormous number of such devices with various types. Therefore, if data generated by such devices were directly transmitted to the cloud servers via the networks, the amount of traffic in the networks would increase, causing a communication delay.

Thus, a system is proposed in which, for example, a plurality of servers are geographically dispersed, and a base station located in a range that is geographically close to each of the servers is assigned thereto, in such a manner that data transmitted from devices located in a wireless communication area formed by the base station is collected and processed by a server close to the position of the device. In this system, since data transmitted from a large number of devices is collected and processed by a plurality of servers in a shared manner, the amount of traffic in the networks is suppressed and an improvement in communication speed can be expected (see, for example, Non-Patent Document 1).

CITATION LIST

Non-Patent Literature

Non Patent Document 1: M. Bouet and V. Conan, "Geo-partitioning of MEC Resources", in ACM SIGCOMM 2017 Workshop on Mobile Edge Computing, 2017.

SUMMARY

Technical Problem

When the position of a device moves, as in the case of a sensor mounted in a vehicle or a sensor incorporated in a portable terminal such as a smartphone carried by a person, a server that receives data transmitted from the device changes. That is, from the viewpoint of the server, the number of devices the data of which is processed by the server varies. In the technique described in Non-Patent Document 1, a coverage area in which each server is in charge of data processing is fixedly assigned in advance according to its area, the number of fixed devices installed, or the like. For this reason, when, for example, a large number of devices intensively move to a coverage area of a specific server, the processing load of the server increases beyond the maximum amount of data that can be processed, possibly causing a problem such as a data processing loss.

The present invention has been made in view of the above-described circumstances, and aims to provide a technique capable of offering constantly stable data processing, regardless of movement of a device when data transmitted from a plurality of devices is processed by a plurality of servers in a shared manner.

Solution to Problem

To achieve the above-described object, according to an aspect of the invention, a coverage area control apparatus capable of controlling communications between a plurality of base stations each of which forms a wireless communication area and a plurality of data processing apparatuses, the apparatus comprises: an information management unit which manages first information and second information, the first information indicating arrangement positions and data processing capabilities of the data processing apparatuses that are geometrically dispersed and that receive data transmitted from a plurality of devices located in the wireless communication area via one of the base stations capable of communicating with the devices, the second information indicating arrangement positions of the base stations; an acquisition unit which acquires information indicating locations of the devices at a given timing; a coverage area calculator which calculates a coverage area of a wireless communication area in which each of the data processing apparatuses is in charge of processing of the data, based on the information indicating the location, and the first information and the second information managed by the information management unit; and a base station assignment control unit which assigns a base station that is in charge of the processing of the data to each of the data processing apparatuses, based on the coverage area calculated by the coverage area calculator.

Advantageous Effects of Invention

It is possible to provide a coverage area control apparatus, a coverage area control method, and a coverage area control program capable of offering constantly stable data processing, regardless of movement of a device when data transmitted from a plurality of devices is processed by a plurality of servers in a shared manner.

DETAILED DESCRIPTION

Hereinafter, embodiments according to the present invention will be described with reference to the drawings.

Embodiment

Configuration Example (1) System

Figure 1:
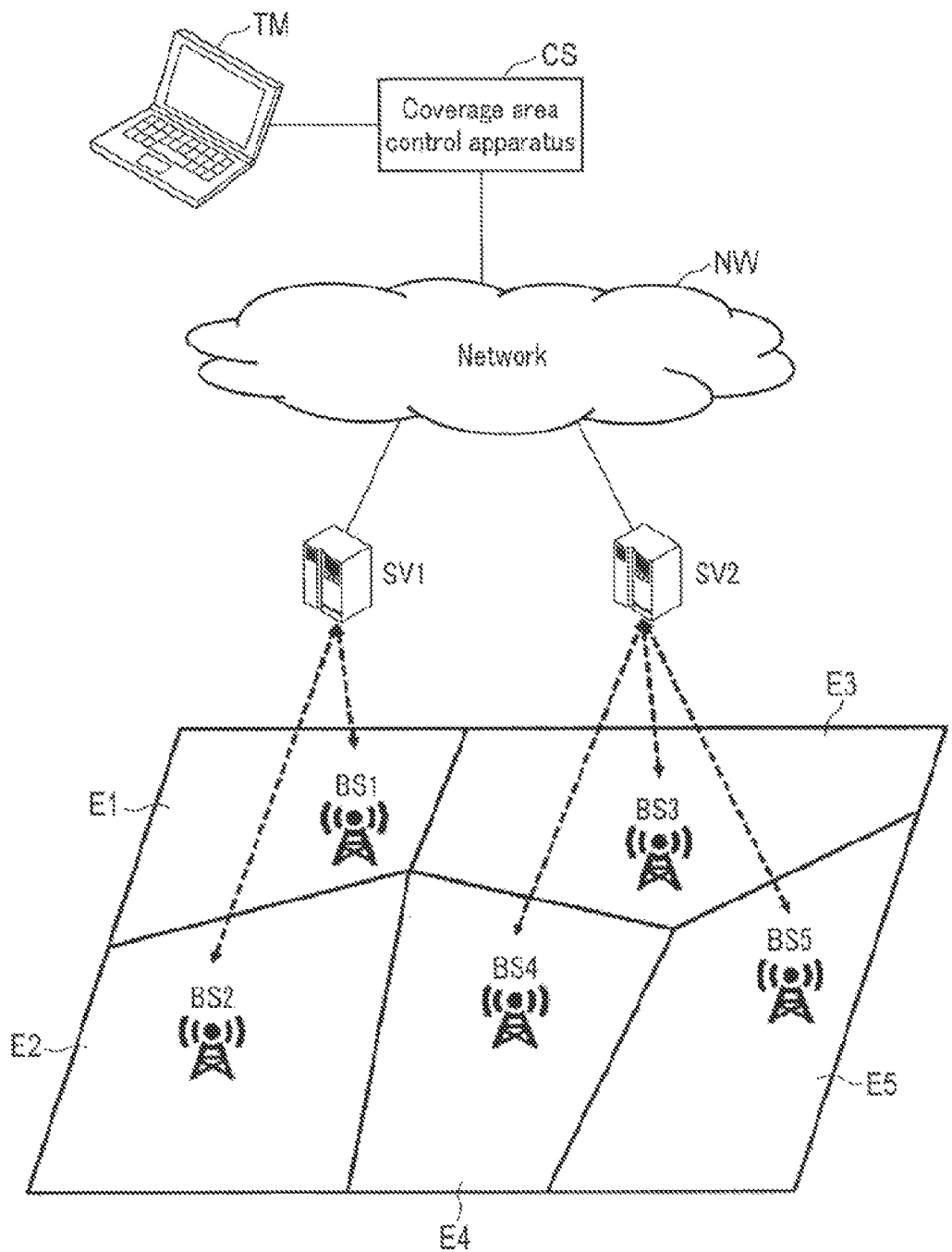
FIG. 1 is a diagram showing an overall configuration of a data collection and analysis system using a coverage area control apparatus according to an embodiment of the present invention.

FIG. 1 is a diagram showing an overall configuration of a data collection and analysis system using a coverage area control apparatus according to an embodiment of the present invention.

In a data collection target area, a plurality of wireless base stations BS1 to BS5 are dispersed. The wireless base stations BS1 to BS5 are comprised of, for example, access points of a wireless local area network (LAN) or wireless base stations of a public mobile communication network, and form wireless communication areas E1 to E5, respectively.

In an embodiment of the present invention, a plurality of servers SV1 and SV2 that function as data processing apparatuses are geographically dispersed. The servers SV1 and SV2, each of which is comprised of, for example, an edge computer, collect data transmitted from a large number of devices located in the wireless communication areas E1 to E5 via the base stations BS1 to BS5, respectively, and perform predetermined analysis processing. The device includes, for example, a movable device in addition to a fixed sensor such as a camera installed on a road or a street corner. Examples of the movable device include various sensors such as a camera mounted on a vehicle and a portable terminal such as a smartphone carried by a person.

FIG. 1 shows a case where five base stations and two servers are provided for the sake of simplicity; however, the number of base stations and servers is not limited thereto.

The system according to an embodiment of the present invention includes a coverage area control apparatus CS. The coverage area control apparatus CS is comprised of, for example, a personal computer or a server computer operated by a system administrator, and is connected to servers SV1 and SV2 via a network NW. The coverage area control apparatus CS variably controls a coverage area in which each of the servers SV1 and SV2 is in charge of data collection in such a manner that a processing load related to the data collection and analysis processing performed by the servers SV1 and SV2 is optimized based on installation positions and data processing capabilities of the servers SV1 and SV2, installation positions of the base stations BS1 to BS5, and locations of the devices.

A management terminal TM is connected to the coverage area control apparatus CS. The management terminal TM is used, for example, to input information indicating installation positions and data processing capabilities of the servers SV1 and SV2 and information on the installation positions of the base stations BS1 to BS5 to the coverage area control apparatus CS. Parameter information that is input from the management terminal TM to the coverage area control apparatus CS is not limited to the above-described information, and may include threshold values, etc. that are necessary for calculating the coverage area.

(2) Coverage Area Control Apparatus

Figure 2:
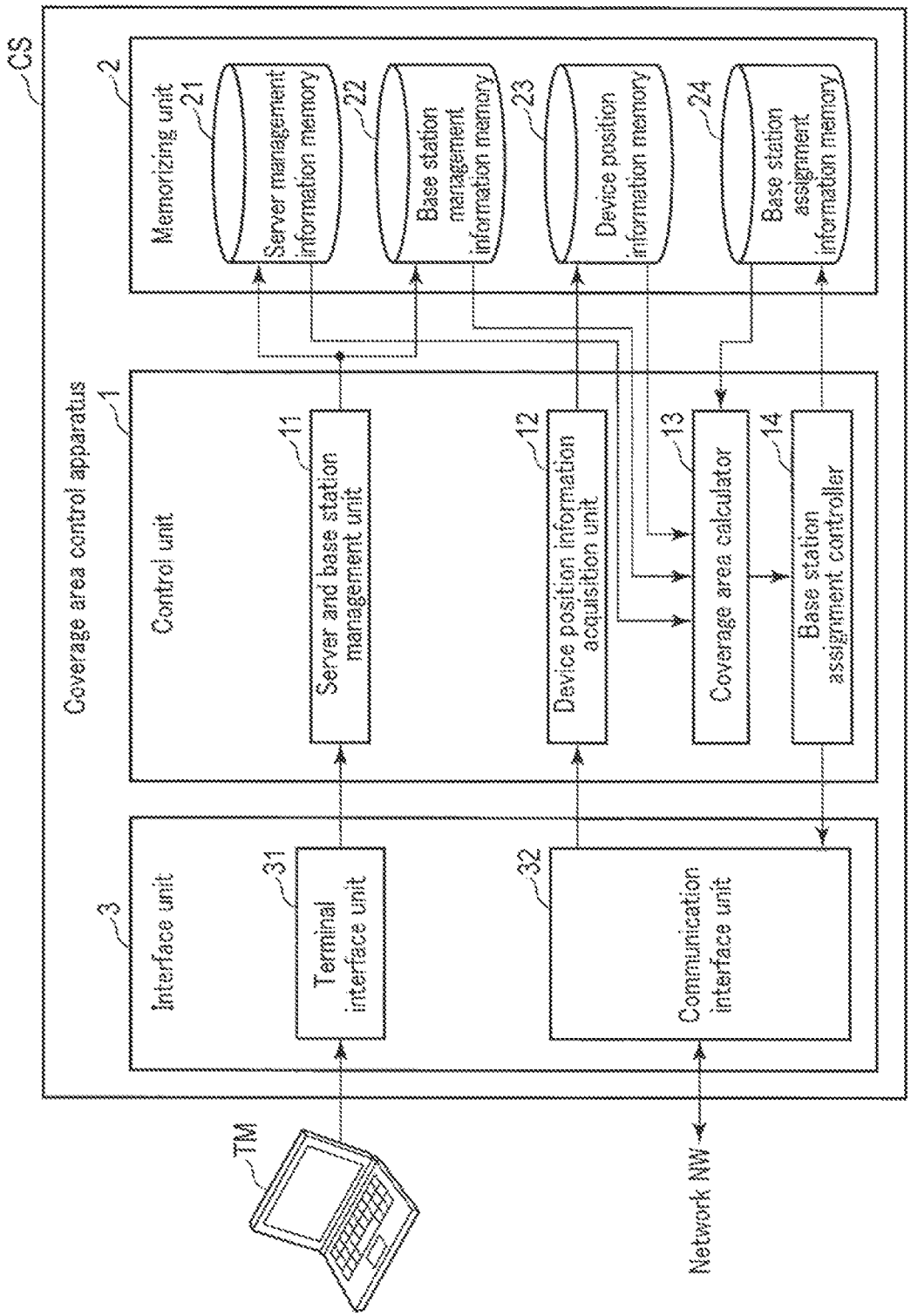
FIG. 2 is a block diagram showing a functional configuration of a coverage area control apparatus according to an embodiment of the present invention.

FIG. 2 is a block diagram showing a functional configuration of a coverage area control apparatus CS according to an embodiment of the present invention.

The coverage area control apparatus CS includes a control unit 1, a memorizing unit 2, and an interface unit 3. The interface unit 3 includes a terminal interface unit 31 and a communication interface unit 32. The terminal interface unit 31 transmits and receives input data and display data to and from the management terminal TM. The communication interface unit 32 performs data communications between the servers SV1 and SV2 and the base stations BS1 to BS5 via the network NW.

The memorizing unit 2 is configured by combining, as a memory medium, for example, a nonvolatile memory capable of performing writing and reading whenever required, such as a hard disk drive (HDD) or a solid state drive (SSD), a nonvolatile memory such as a read-only memory (ROM), and a volatile memory such as a random access memory (RAM). Its memory area includes a program memory area and a data memory area. The program memory area stores programs necessary for executing various control processes according to an embodiment of the present invention.

In the data memory area, a server management information memory 21, a base station management information memory 22, a device position information memory 23, and a base station assignment information memory 24 are provided. The server management information memory 21 is used to store server management information containing information on installation positions and information indicating processing capabilities of the servers SV1 and SV2 which have been input by the management terminal TM. The base station management information memory 22 is used to store base station management information containing information on the installation positions of the base stations BS1 to BS5 which have been input by the management terminal TM. The device position information memory 23 stores location information transmitted from each device. The base station assignment information memory 24 stores information indicating a range of each of the wireless communication areas E1 to E5 where each of the servers SV1 and SV collects data, namely, information indicating assignment results of the base stations BS1 to BS5.

The control unit 1 includes, for example, a hardware processor such as a central processing unit (CPU), and includes, as control functions for implementing the invention, a server and base station management unit 11, a device position information acquisition unit 12, a coverage area calculator 13, and a base station assignment controller 14. All of these control function units are implemented by causing the hardware processor to execute the programs stored in the program memory area.

The server and base station management unit 11 receives, via the terminal interface unit 31, the information on the installation positions and the information indicating the processing capabilities of the servers SV1 and SV2 and the information on the installation positions of the base stations BS1 to BS5 which have been input by an administrator at the management terminal TM, and stores them in the server management information memory 21 and the base station management information memory 22, respectively.

The device position information acquisition unit 12 acquires location information of each of the devices from the base stations BS1 to BS5 via the network NW and the communication interface unit 32 in a preset cycle, for example, and temporarily stores the location information in the device position information memory 23. The location information of each of the devices may be longitude and latitude information measured by the global positioning system (GPS) equipped in the device itself, or information indicating a wireless communication area in which the device is located (e.g., a base station ID) which is detected by the base stations BS1 to BS5.

Whenever new location information of each device is acquired by the device position information acquisition unit 12, the coverage area calculator 13 calculates an optimum coverage area in which each of the servers SV1 and SV2 should take charge of data collection and analysis processing from the devices at that point in time, based on the information on the installation positions and the information indicating the processing capabilities of the servers SV1 and SV2 stored in the server management information memory 21, the information on the installation positions of the base stations BS1 to BS5 stored in the base station management information memory 22, and the acquired new location information of each of the devices. A technique of calculating the optimum coverage area will be described in detail later.

The base station assignment controller 14 changes assignments of the base stations BS1 to BS5 to the servers SV1 and SV2 and controls their operating states based on the information indicating the optimum coverage area of each of the servers SV1 and SV2 calculated by the coverage area calculator 13, and stores the information indicating the results in the base station assignment information memory 24.

Operation Example

Next, an operation example of the coverage area control apparatus CS with the above configuration will be described.

Figure 3:
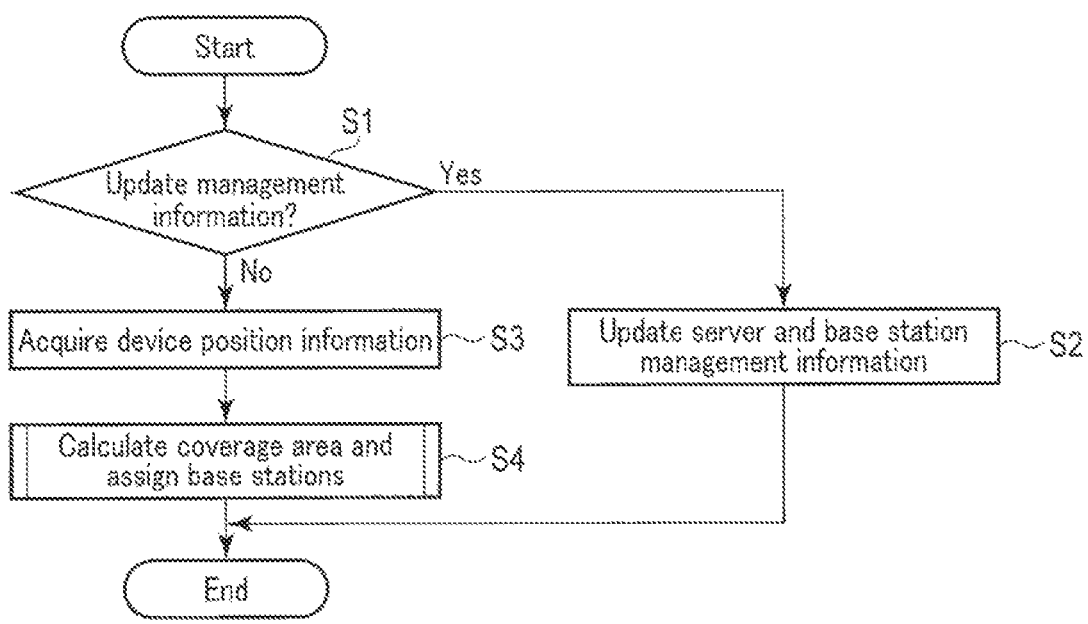
FIG. 3 is a flowchart showing an overall procedure of control performed by a coverage area control apparatus shown in FIG. 2 and contents of the control.

FIG. 3 is a flowchart showing an overall procedure of control performed by the control unit 1 of the coverage area control apparatus CS and contents of the control.

(1) Management of Server and Base Station Management Information

Prior to operation of the system, the system administrator inputs, via a management terminal TM, information on the installation positions and information indicating the processing capabilities of the servers SV1 and SV2, and information on the installation positions of the base stations BS1 to BS5. The information on the installation position is represented by, for example, latitude and longitude information. The information indicating the processing capability of each of the servers SV1 and the SV2 is expressed as, for example, an amount of data processing per unit time. The management terminal TM transmits, to the coverage area control apparatus CS, the information on the installation positions and the information indicating the processing capabilities of the servers SV1 and SV2 and the information on the installation positions of the base stations BS1 to BS5, which have been input, together with a request for updating the management information.

Upon detecting the request for updating the management information transmitted from the management terminal TM at step S1 under the control of the server and base station management unit 11, the coverage area control apparatus CS receives the information on the installation positions and the information indicating the processing capabilities of the servers SV1 and SV2, and the information on the installation positions of the base stations BS1 to BS5 via the terminal interface unit 31 at step S2. Thereafter, the coverage area control apparatus CS associates the information on the installation positions and the information indicating the processing capabilities of the servers SV1 and SV2 with identification information (a server ID) of the server, and stores the associated information as server management information in the server management information memory 21. The server and base station management unit 11 associates the information on the installation position of the base station with identification information (base station ID) of the base station, and stores the associated information as base station management information in the base station management information memory 22.

The above-described process of updating the server management information and the base station management information at steps S1 and S2 is executed whenever a request for updating management information is transmitted from the management terminal TM in accordance with new installation or a change in installation position of the server, a change in processing capability of the server, and new installation or a change in installation position of the base station.

(2) Acquisition of Position Information of Devices

When an operation of the system is started, the coverage area control apparatus CS executes, under the control of the device position information acquisition unit 12, a process of acquiring, from each of the devices, information indicating its location at a preset cycle at step S3. This process is performed by, for example, simultaneously transmitting a request for acquiring position information to each device and receiving position information returned from each device in response to the request. The position information of each device may be acquired by receiving position information transmitted from each device periodically or autonomously whenever the position changes.

(3) Calculation of Coverage Area and Assignment of Base Stations

The coverage area control apparatus CS executes a process of calculating an optimum coverage area of each of the servers SV1 and SV2 and a process of assigning a base station based on the calculation result at step S4 under the control of the coverage area calculator 13 and the base station assignment controller 14 whenever the location information of each of the devices is acquired by the device position information acquisition unit 12.

In an embodiment of the present invention, a clustering calculation that employs k-means, for example, as an algorithm for calculating the coverage area of each of the servers SV1 and SV2 is used. In the k-means clustering calculation, an optimum coverage area can be calculated by the following procedure.

Step 1. Randomly assign a cluster to each point.
Step 2. Calculate a centroid of each cluster.
Step 3. Based on the calculated centroids of the clusters, change the cluster to which each point belongs to a cluster with the nearest centroid.
Step 4. As long as there is a change in the cluster to which each point belongs, the processing returns to Step 2 and the above processing is repeated, and when there is no longer a change, the processing ends.

That is, k-means is an algorithm for classifying points into a given number of clusters k in such a manner that a mean of distances between the points and the centroid of each cluster to which each point belongs is minimized.

The clustering algorithm that uses k-means is described in detail in, for example, J. MacQueen (1967). "Some methods for classification and analysis of multivariate observations". Proc. Fifth Berkeley Symp. on Math. Statist. and Prob., Vol. 1 (Univ. of Calif. Press, 1967), p. 281-297.

When operating a clustering algorithm such as k-means, what value should be set as the number of clusters k is an issue. In an embodiment of the present invention, since the coverage area of each of the servers SV1 and SV2 is calculated, the number of activated servers, that is, the number of servers that execute the processing of collecting and analyzing data transmitted from devices is set as the number of clusters k.

If the number of activated servers were too small, that is, if the number of clusters k were too small, the server would not be able to perform the processing of collecting and analyzing data transmitted from all the devices, and would be overloaded. In addition, a delay in communication from the device to the server may increase excessively and result in failure to satisfy the communication performance requirements of the application.

On the other hand, if the number of activated servers were too large, that is, if the number of clusters k were too large, it would be possible for some of the servers to collect and process data transmitted from all the devices, resulting in an increase in the number of servers in an idle state and causing waste in processing resources of the entire system. In addition, even though the communication delay sufficiently satisfies the communication performance requirements of the application, an excessive number of servers exceeding such requirements would be constantly in operation, resulting in an increase in the power consumption of the system.

In the clustering calculation, position information of base stations and position information of devices are used to calculate the coverage area of each server, that is, which server is to be in charge of which base station. If the base station that each server is in charge of is calculated, it is possible to track the device that is located in the wireless communication area of each base station; thus, calculating a base station that the server is in charge of and calculating a device that the server is in charge of are synonymous. In an optimization calculation based on clustering, calculations are repeated in such a manner that a communication distance between a device that is located in a wireless communication area of each base station and a server that is in charge of that base station can be minimized.

(3-1) First Embodiment of Coverage Area Calculation Algorithm

The first embodiment relates to a method of setting the initial value of the number of clusters k to "k=1", and starting a clustering calculation.

In this example, a process of selecting a single server at a time and calculating means of communication distances between the selected server and the devices, and selecting a single server that provides the minimum mean communication distance is performed. However, if communications from a large number of devices were concentrated on a single selected server, the server would be overloaded.

Thus, when the number of devices that a single server is in charge of exceeds a threshold value, in addition the communication distances between the server and the devices, the clustering calculation is performed again by increasing the number of clusters k by 1 to satisfy "k=2" and selecting two servers. Thereafter, the above clustering optimization calculation is similarly repeated whenever the number of clusters k is increased by 1, and the number of clusters k (the number of servers) is obtained at which the communication distances between the selected server and the device are minimized and the server is not overloaded, that is, the number of devices that the server is in charge of is equal to or less than the threshold value. Thereafter, a base station that is in charge of data processing is assigned to each server selected at this time.

Figure 6:
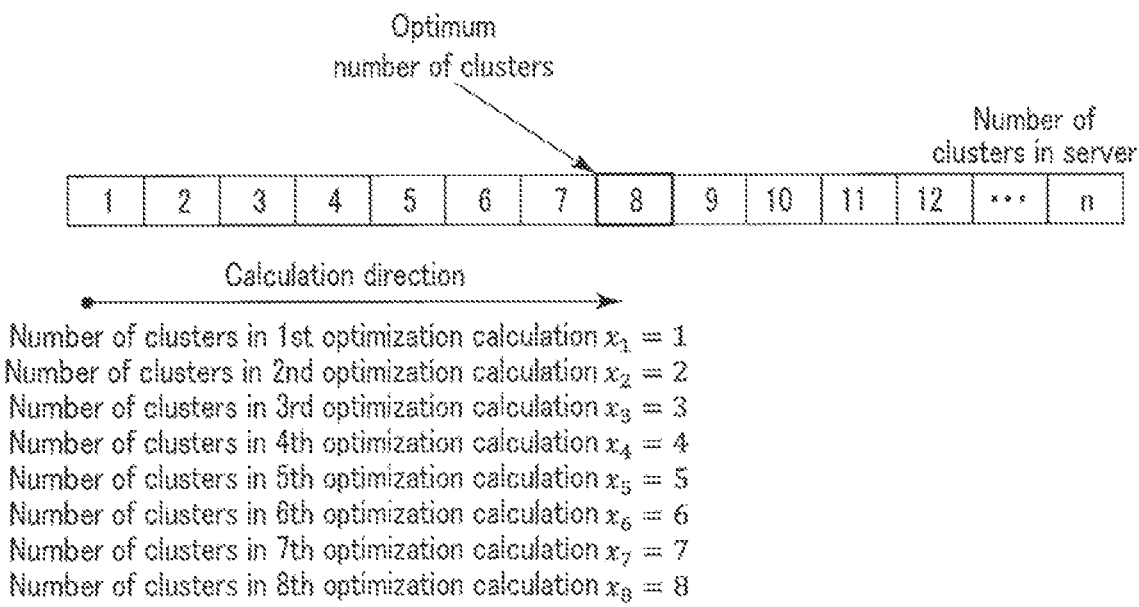
FIG. 6 is a diagram illustrating another example of the coverage area calculation shown in FIG. 4.

FIG. 6 shows an example of clustering calculation results according to the first embodiment, in which a clustering calculation is started from the number of clusters k satisfying k=1, and when the number of clusters k satisfy k=8, that is, when eight servers are selected, a condition in which the communication distances between these servers and the devices are minimized and the servers are not overloaded can be detected.

According to the first embodiment described above, in a system in which the number of devices is relatively small, an optimum number of clusters k (number of servers) can be calculated in a relatively short time.

(3-2) Second Embodiment of Coverage Area Calculation Algorithm

In the first embodiment, if the scale of the system increased and a large number of devices were located in the covered area, a clustering calculation started by setting the initial value of the number of clusters k to "1" would be repeated a large number of times until an optimum number of clusters k (number of servers) would be calculated. In addition, if the position of the device frequently changes, it is necessary, for example, to repeatedly perform a clustering calculation of calculating the optimum number of clusters k (number of servers) every second, thus imposing a huge processing load on the coverage area control apparatus CS. As a result, if the number of devices reaches, for example, tens of millions to millions, it may be difficult to update the coverage areas of the servers in real time.

Accordingly, in the second embodiment, a clustering calculation is performed as will be described below. That is, in the second embodiment, in order to obtain an optimum number of clusters k (number of servers), the initial value of the number of clusters k is set to an optimum number k' of clusters obtained by the immediately preceding (previous) clustering calculation, instead of making the initial value of the number of clusters k satisfy k=1. This is based on the fact that, since the position information of the device rarely changes rapidly in a short period of time, the optimum number of clusters k obtained by the current clustering calculation becomes close to the optimum number k' of clusters obtained by the immediately preceding clustering calculation.

Figure 5:
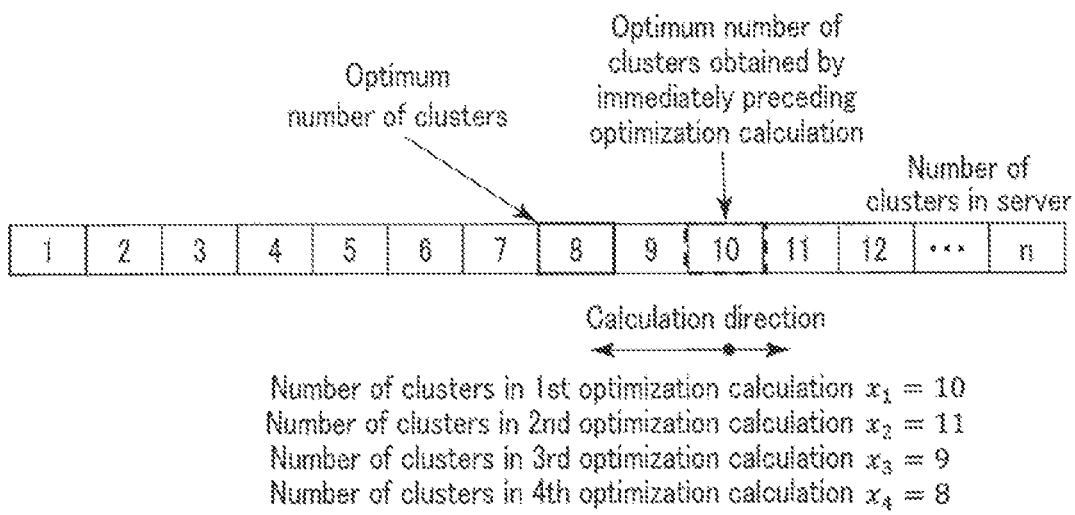
FIG. 5 is a diagram illustrating an example of the coverage area calculation shown in FIG. 4.

FIG. 5 is a diagram used for illustrating the second embodiment.

In a coverage area calculation algorithm in the second embodiment, a clustering calculation is started by setting an initial value of the number of clusters k to an optimum number of clusters k' obtained in the immediately preceding clustering calculation.

When an optimization calculation is performed by setting the initial value of the number of clusters k to the optimum number of clusters k' obtained by the immediately preceding clustering calculation, the optimum number of clusters at this time may be one of three cases: same as the initial value, larger than the initial value, and smaller than the initial value. Thus, in terms of the calculation direction of the optimization calculation, a direction in which the number of clusters k is decreased by 1 and a direction in which the number of clusters k is increased by 1, for example, are alternately set, with reference to the set initial value.

In the example of FIG. 5, for example, the initial value of the number of clusters k is set to satisfy k=10 and an optimization calculation is started, and then clustering results obtained by setting the number of clusters k to satisfy k=9 and setting the number of clusters k to satisfy k=11 are sequentially obtained. At this time, let us assume, for example, that an optimum clustering result in which the communication distances between the devices and the servers are minimized and the number of devices that each server is in charge of is equal to or less than a threshold value, that is, in which the servers are not overloaded, can be obtained by an optimization calculation where the number of clusters k satisfies k=9. In this case, it is determined that "it is purposeless to increase the number of clusters any more", and the optimization calculation is not performed in the direction of increasing the number of clusters k as the calculation direction of the number of clusters.

That is, in the example of FIG. 5, an optimization calculation where the number of clusters k satisfies k=11 is not performed. This is because, if nine appropriately selected servers were used for the current position information of the device, each server would be able to collect and analyze data to be transmitted from all the devices, making it obvious that ten or more servers would be unnecessary.

Similarly, let us assume, for example, that an optimum clustering result in which the communication distance between the device and the server is minimized and the server is not overloaded can be obtained by an optimization calculation where the number of clusters k satisfies k=11. In this case, it is determined that "it is meaningless to decrease the number of clusters any more", and an optimization calculation in the direction of decreasing the number of clusters k is not performed as the calculation direction of the number of clusters.

In the example of FIG. 5, for example, an optimization calculation where the number of clusters k satisfies k=9 or less becomes unnecessary. This is because, if ten or fewer selected servers were used for the current position information of the device, each server would not be able to collect and analyze data transmitted from all the devices, and would be overloaded, making it obvious that ten or fewer servers would not be sufficient to provide the service.

By repeating the above calculation, it is possible to obtain an optimum clustering result in which the communication distances between the devices and the servers are minimized and the servers are not overloaded. In the example of FIG. 5, assuming, for example, that an optimum clustering result is obtained when the number of clusters k satisfies k=8, the number of times of clustering calculations in this case is four. According to the first embodiment shown in FIG. 6, eight clustering calculations are required until an optimum clustering result is obtained when the number of clusters k satisfies k=8. Therefore, by using the calculation algorithm of the second embodiment, the number of calculations can be reduced by half. Consequently, even when the number of base stations and the number of devices are very large, it is possible to obtain the coverage area of the server in real time by reducing the calculation time of the optimization calculation.

In the above description, an optimum number of clusters k is obtained in such a manner that the communication distances between the devices and the servers are minimized and the servers are not overloaded. However, the communication distance need not be minimized, and the number of clusters k may be obtained when the communication distance is equal to or less than a threshold value set in advance according to the processing capability of the server and when the number of devices that each server is in charge of is equal to or less than the threshold value (each server is not overloaded).

Figure 4:
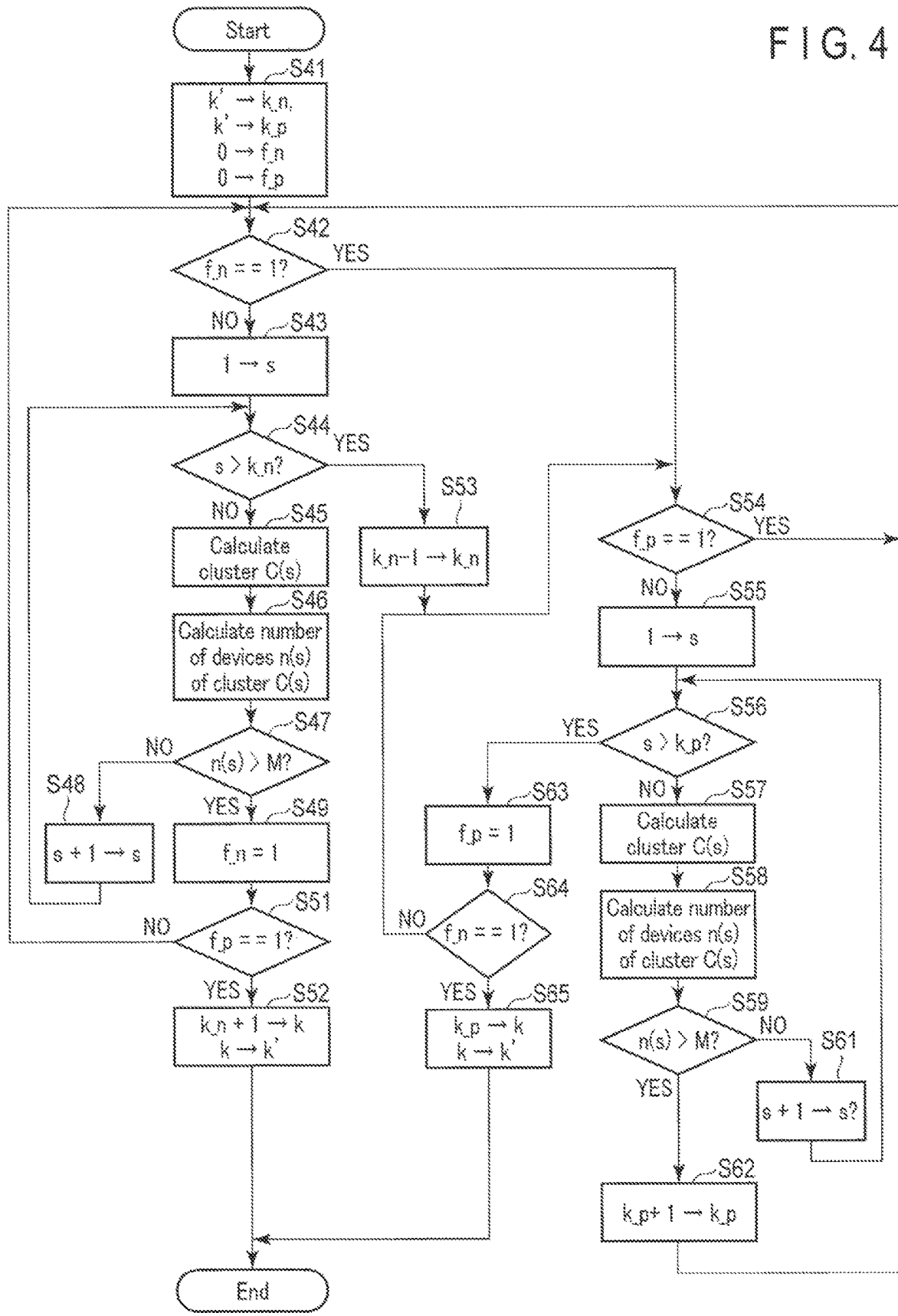
FIG. 4 is a flowchart showing a procedure and contents of a coverage area calculation and base station assignment processing in the control procedure shown in FIG. 3.

FIG. 4 is a flowchart showing a specific procedure of the processing of the coverage area control apparatus CS and contents of the processing at the time of executing a coverage area calculation algorithm in the second embodiment.

(3-2-1) Pre-Setting of Parameters

At step S41, the coverage area control apparatus CS sets various parameters necessary for the processing under the control of the coverage area calculator 13. The current number of clusters is represented by a variable k, for example. The variable k indicates the number of servers to be activated. As an initial value of the variable k, k=1 is substituted. Also, it is assumed that the optimum number of clusters obtained by the immediately preceding clustering calculation is k', and that a temporary variable for storing a number of clusters equal to or larger than k' is k_p. Let k' be the initial value of k_p. Also, let k_n be a temporary variable that stores a number of clusters equal to or less than k'. Let k' be the initial value of k_n.

In the second embodiment, when the state in which "it is meaningless to increase the number of clusters any more" is detected in the process of the optimization calculation, an optimization calculation in the direction of increasing the number of clusters k is not performed as the calculation direction of the number of clusters, as described above. Therefore, a flag indicating whether or not the state in which "it is meaningless to increase the number of clusters any more" is detected is defined as f_p, and when such a state is not detected, f_p="0" is set, and when such a state is detected, f_p="1" is set. Similarly, a flag indicating whether or not a state in which "it is meaningless to decrease the number of clusters any more" is detected is defined as f_n, and when such a state is not detected, f_n="0" is set, and when such a state is detected, f_n="1" is set.

(3-2-2) Optimization Calculation in Direction of Decreasing Number of Clusters k The coverage area calculator 13 starts an optimization calculation in a direction of decreasing the number of clusters k to k' or less. It is determined, for example, whether or not the flag f_n is "1" at step S42, and if f_n="1" is not yet satisfied, the variable s is set to the initial value "1" at step S43. The variable s is a temporary variable representing a cluster ID at the time of clustering calculation. Next, the coverage area calculator 13 monitors whether or not the variable s of the cluster ID exceeds the variable k_n at step S44, and when the variable s does not exceed the variable k_n, the coverage area calculator 13 executes a clustering optimization calculation at steps S45 to S48 as will be described below.

That is, the coverage area calculator 13 calculates a cluster C(s) at step S45. In the calculation of the cluster C(s), in order to minimize the communication distance between the devices and the server corresponding to the cluster ID of the variable s, a calculation is performed as to which base station is assigned to the server. In other words, a calculation for determining the coverage area of the server corresponding to the cluster ID of the variable s is performed.

Next, at step S46, the coverage area calculator 13 calculates the number of devices n(s) of the cluster C(s). In this calculation, the number of devices from which the server corresponding to the cluster ID of the variable s processes transmitted data is obtained. In other words, the number of devices included in the coverage area of each server is calculated.

Subsequently, at step S47, the coverage area calculator 13 determines whether or not the calculated number of devices n(s) of the cluster C(s) exceeds a threshold value M. As a result of this determination, if the number of devices n(s) does not exceed the threshold value M, the variable s is incremented at step S48 to select a server with the next cluster ID, and the processing returns to step S44 to sequentially select the servers by incrementing the variable s of the cluster ID until s exceeds the variable k_n, while repeating the calculation of the cluster C(s) and the calculation of the number of devices n(s) at steps S45 to S48.

Let us assume that the number of devices n(s) does not exceed the threshold value M even if the clustering calculation is performed until the variable s exceeds k_n. In this case, the coverage area calculator 13 determines that the optimum clustering has been obtained with the current number of clusters without causing overloading due to excessive concentration of communications from devices on a specific server, and decreases the number of clusters k_n by 1 at step S53, since there is a possibility that clustering may be performed with a smaller number of clusters. Thereafter, the variable s is returned to the initial value "1" at step S43, and an optimization calculation in the direction of decreasing the number of clusters k at steps S44 to S48 is performed again.

Prior to performing the optimization calculation in the direction of decreasing the number of clusters k again, the coverage area calculator 13 confirms whether or not a clustering calculation in the direction of increasing the number of clusters k can be performed based on a flag f_p at step S54. When the flag f_p is "1", that is, when a calculation in the increasing direction can no longer be performed, an optimization calculation in the direction of decreasing the number of clusters k is performed again.

On the other hand, when the flag f_p is "0", an optimization calculation in the direction of increasing the number of clusters k is performed, and then an optimization calculation in the direction of decreasing the number of clusters k is performed again. This is for the purpose of alternately executing an optimization calculation in the direction of decreasing the number of clusters k and an optimization calculation in the direction of increasing the number of clusters k whenever a single cluster k is selected. The processing of an optimization calculation in the direction of increasing the number of clusters k will be described later.

Let us assume that the number of devices n(s) of the cluster C(s) exceeds a threshold value M in one of the servers as a result of an optimization calculation in the direction of decreasing the number of clusters k at steps S45 to S48. In this case, the coverage area calculator 13 determines that data to be transmitted from all the devices would not be fully processed with the current number of clusters k, that is, data to be transmitted from the devices would be excessively concentrated on a specific server and overloading would occur. That is, when the number of devices n(s) of the cluster C(s) exceeds the threshold value M during performance of the clustering calculation in the direction of the number of clusters that is equal to or less than k_n, it is determined that it is meaningless to decrease the number of clusters k_n any more, since the number of clusters that is equal to or less than k_n is too small. Therefore, in this case, the coverage area calculator 13 sets the flag f_n to "1" at step S49, confirms that the flag satisfies f_p="0" at step S51 without performing a clustering calculation in the direction of the number of clusters that is equal to or less than k_n, and then returns to step S42.

(3-2-3) Optimization Calculation in Direction of Increasing Number of Clusters k The coverage area calculator 13 determines whether or not the flag f_p is is set to "1" at step S54, and sets, if f_p="1" is not yet satisfied, the variable s of the cluster ID to the initial value "1" at step S55. Subsequently, the coverage area calculator 13 monitors whether or not the variable s of the cluster ID exceeds the variable k_p at step S56, and when the variable s does not exceed the variable k_p, the coverage area calculator 13 executes a clustering optimization calculation at steps S57 to S61 as will be described below.

That is, the coverage area calculator 13 calculates a cluster C(s) at step S57. In the calculation of the cluster C(s), in order to minimize the communication distances between the device and the server corresponding to the cluster ID of the variable s, a calculation is performed as to which base station is assigned to the server, as in the case of step S45 described above. In other words, a calculation for determining the coverage area of the server corresponding to the cluster ID of the variable s is performed.

Subsequently, at step S58, the coverage area calculator 13 calculates the number of devices n(s) of the cluster C(s). In this calculation, the number of devices from which the server corresponding to the cluster ID of the variable s processes transmitted data is obtained. In other words, the number of devices included in the coverage area of each server is calculated.

Subsequently, at step S59, the coverage area calculator 13 determines whether or not the calculated number of devices n(s) of the cluster C(s) exceeds a threshold value M. As a result of this determination, if the number of devices n (s) does not exceed the threshold value M, the variable s is incremented at step S61 to select a server with the next cluster ID, and the processing returns to step S56 to sequentially select the servers by incrementing the variable s of the cluster ID until s exceeds the variable k_p, while repeating the calculation of the cluster C(s) and the calculation of the number of devices n(s) at steps S57 to S61.

Let us assume that the number of devices n(s) exceeds the threshold value M. In this case, the coverage area calculator 13 determines that data to be transmitted from all the devices would not be fully processed with the current number of clusters k, that is, data to be transmitted from the devices would be excessively concentrated on the server and overloading would occur. Subsequently, the number of clusters k_n is increased by 1 at step S62. Thereafter, the variable s is returned to the initial value "1" at step S55, and an optimization calculation in the direction of increasing the number of clusters k at steps S57 to S61 is performed again.

Prior to performing the optimization calculation in the direction of increasing the number of clusters k again, the coverage area calculator 13 confirms whether or not a clustering calculation in the direction of decreasing the number of clusters k can be performed based on a flag f_n at step S42. When the flag f_n is "1", that is, when a calculation in the decreasing direction can be no longer performed, an optimization calculation in the direction of increasing the number of clusters k is performed again.

On the other hand, when the flag f_n is "0", the processing returns to where an optimization calculation in the direction of decreasing the number of clusters k is performed, and then an optimization calculation in the direction of increasing the number of clusters k is performed again. As a result, an optimization calculation in the direction of decreasing the number of clusters k and an optimization calculation in the direction of increasing the number of clusters k are alternately executed whenever a single cluster k is selected. That is, recalculation of clustering in which k_n is decreased by 1 and recalculation of clustering in which k_p is increased by 1 are alternately repeated.

(3-2-4) Control of Assignment of Base Stations to Servers

Let us assume that, as a result of alternately executing an optimization calculation in the direction of decreasing the number of clusters k and an optimization calculation in the direction of increasing the number of clusters k, both of the flags f_p and f_n have become "1" as a result of a clustering calculation of a certain number of clusters k. In this case, when an optimization calculation in the direction of decreasing the number of clusters k has been performed, for example, the coverage area calculator 13 shifts from step S51 to step S52, sets the number of clusters k_n+1 as the number of clusters k, sets the number of clusters k at this time as the optimum number of clusters k', and thereby ends the processing.

On the other hand, when an optimization calculation in the direction of increasing the number of clusters k has been performed, the processing shifts from step S64 to step S65, the number k_p of clusters at this time is set as the number of clusters k, the number of clusters k is set as the optimum number of clusters k', and thereby the processing ends. Thus, an optimum value of the number of clusters k and information indicating a coverage area covered by the cluster are obtained.

When the optimization calculation is completed, the coverage area control apparatus CS specifies a base station located in a coverage area of a server corresponding to the optimum value k' of the number of clusters k, based on the result of the optimization calculation under the control of the base station assignment controller 14. That is, an assignment of a base station to each server used for the data collection processing is calculated. The base station assignment controller 14 stores information indicating the result of assignment of the base station to each server used for the data collection processing in the base station assignment information memory 24, in association with the information indicating the update time. At the same time, the base station assignment controller 14 generates update instruction information containing the base station assignment information, and transmits the update instruction information from the communication interface unit 32 to the corresponding server.

As a result, the server that has received the update instruction information selects a base station to be received by the server itself according to the base station assignment information included in the update instruction information, and then receives and analyzes data transmitted from the device via the selected base station.

Figure 7:
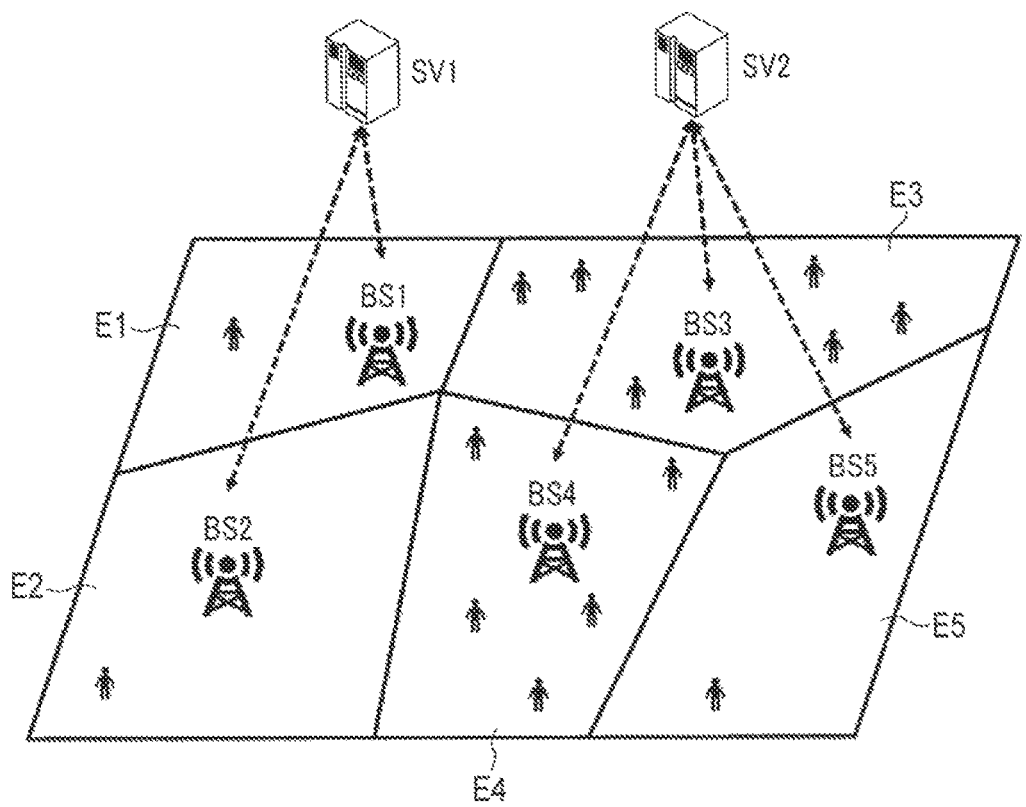
FIG. 7 is a diagram showing a first example of assigning base stations to servers.

Let us assume, for example, that base stations BS1 and BS2 and base stations BS3 to BS5 are assigned to servers SV1 and SV2, respectively. FIG. 7 shows an example of this state. In this state, the distribution of the locations of the devices (illustrated by human figures) is biased to wireless communication areas E3 to E5, rather than wireless communication areas E1 and E2, and concentrates on the server SV2.

In this case, the coverage area control apparatus CS performs a clustering calculation based on information indicating installation positions and processing capabilities of the servers SV1 and SV2 stored in advance, information on the installation position of each of the base stations BS1 to BS5, and acquired location information of each of the devices. Thereafter, information on the optimum assignment of base stations to the servers SV1 and SV2 that satisfies the requirements that the communication distances between the servers SV1 and SV2 and the respective devices would be minimized and the servers SV1 and SV2 would not be overloaded is obtained. In accordance with the base station assignment information, the assignment of the base stations BS1 to BS5 to the servers SV1 and SV2 is changed.

Figure 8:
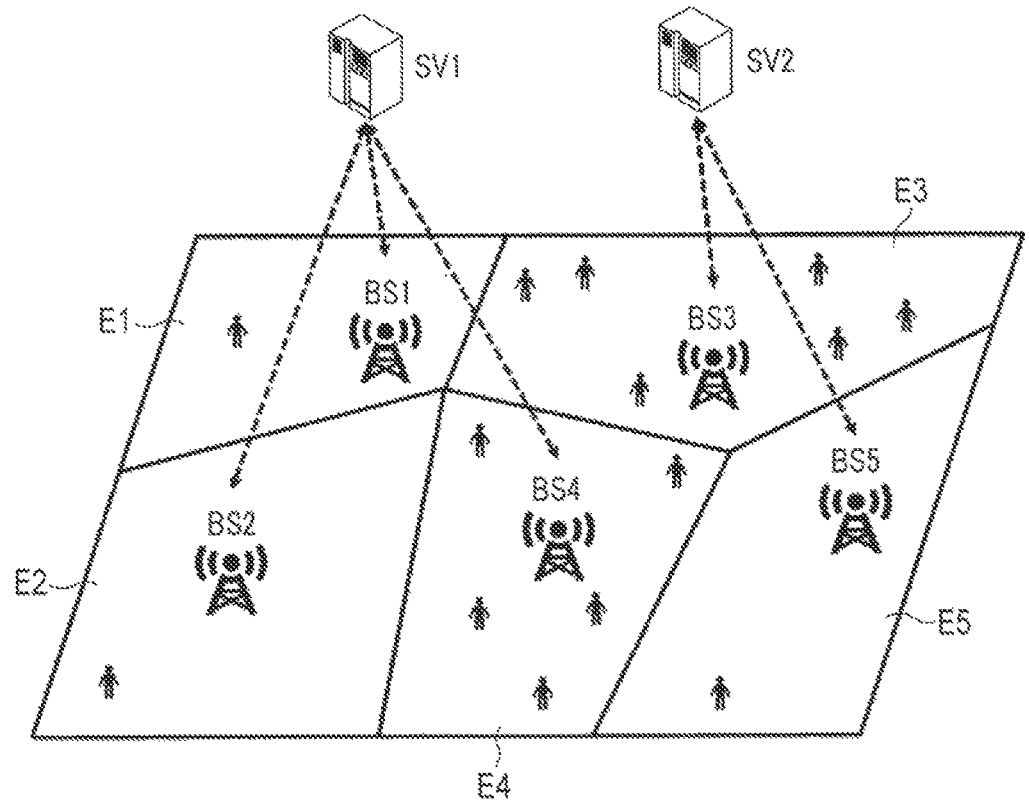
FIG. 8 is a diagram showing a second example of assigning base stations to servers.

For example, the base stations BS1, BS2, and BS4 are assigned to the server SV1, and the base stations BS3 and BS5 are assigned to the server SV2, as shown in FIG. 8. As a result, the processing load on the server SV2 is reduced, thus allowing the server SV2 to perform stable data collection and analysis processing.

Let us also assume that the number of devices located in a service area of the system has decreased as a result of movement of the devices. In this case, the coverage area control apparatus CS executes a clustering calculation again based on the location information of each of the reduced number of devices, and obtains the information on the optimum assignment of the base stations to the servers SV1 and SV2. In accordance with the base station assignment information, the assignment of the base stations BS1 to BS5 to the servers SV1 and SV2 is changed.

Figure 9:
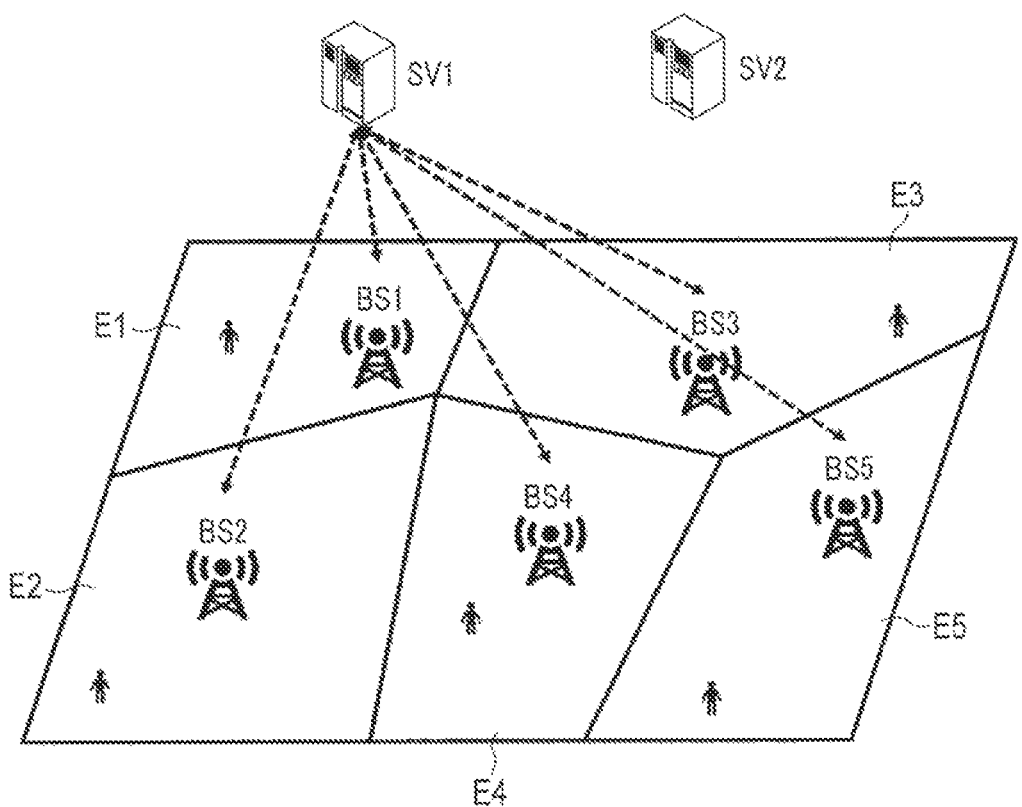
FIG. 9 is a diagram showing a third example of assigning base stations to servers.

For example, as shown in FIG. 9, all the base stations BS1 to BS5 are assigned to the server SV1, and the assignment of base stations to the server SV2 is eliminated to set the server SV2 to a non-operating state. As a result, it becomes possible to reduce the power consumption of the entire system and reduce the operation cost by stopping the operation of the server SV2 while maintaining the collection and analysis processing of data transmitted from each of the devices through the server SV1.

Advantageous Effect

In an embodiment, a coverage area control apparatus CS is newly provided, as described above. Based on information indicating installation positions and processing capabilities of the servers SV1 and SV2, information on the installation positions of the base stations BS1 to BS5, and acquired location information of the devices, the coverage area control apparatus CS performs a clustering calculation for obtaining an optimum coverage area for the servers SV1 and SV2 that satisfies the requirements that the communication distances between the servers SV1 and SV2 and the respective devices are minimized and the servers SV1 and SV2 are not overloaded. Based on the information indicating the optimum coverage area obtained by the clustering calculation, assignments of the base stations BS1 to BS5 to the servers SV1 and SV2 are updated.

Accordingly, even when movable devices such as sensors mounted on vehicles and portable terminals carried by persons are included in a plurality of devices, for example, and such devices move and their locations change, the coverage area of each of the servers SV1 and SV2, that is, the assignments of the base stations BS1 to BS5 the data of which is to be processed by each of the servers SV1 and SV2 is automatically updated in real time, in such a manner that the coverage area becomes optimum on a moment-to-moment basis according to the change in the location of the devices. As a result, the number of devices for which each of the servers SV1 and SV2 is in charge of processing of their data can be constantly maintained at an optimum number, thus preventing concentration of the processing load on some of the servers and improving the operational reliability of the entire system. In addition, the necessity for the system administrator to manually perform an operation of monitoring the processing load of each of the servers SV1 and SV2 to resolve the concentration of the processing load is eliminated, thus greatly reducing the operation cost of the system.

Moreover, a clustering calculation for obtaining the optimum coverage area is started using the optimum value k' of the number of clusters k obtained by the previous optimization calculation as an initial value, and a clustering calculation in the direction of decreasing the number of clusters k and a clustering calculation in the direction of increasing the number of clusters k are alternately performed, with reference to the optimum value k' at the center. It is thereby possible to obtain the optimum number of clusters k quickly, thus reducing the number of repetitions of the optimization calculation and shortening the time required to obtain the optimum coverage areas of the servers SV1 and SV2, thus further improving the real-time properties of the optimization control.

Furthermore, when there is a server to which a base station need not be assigned as a result of a clustering calculation, the server is controlled so as to be in an operation stop state. It is thereby possible to reduce the power consumption of the entire system and reduce the operation cost by stopping the operation of other servers, while maintaining the collection and analysis processing of the data transmitted from each device through some of the servers.

Other Embodiments

In the above-described embodiment, a clustering calculation for obtaining an optimum coverage area is performed at a predetermined cycle set in advance, but may be performed when a server or a base station has been newly installed or there has been a change in the installation position. Alternatively, a clustering calculation may be executed when a fixed-type device has been newly installed, or there has been a change in the installation position.

In addition, various modifications may be made without departing from the spirit of the invention as to the installation number and the installation positions of data processing apparatuses and base stations, the type of the devices, the acquisition timing and the acquisition method of the location information thereof, the type of the clustering algorithm, and the like.

The embodiment includes the following aspects.

In a first aspect, a coverage area calculator performs, while changing the number of candidates for a data processing apparatus that performs data processing, an optimization calculation for calculating the number of data processing apparatuses and the number of base stations assigned to the data processing apparatuses when communication distances between the data processing apparatuses and a plurality of devices are minimized and an amount of processing load of the data processing apparatus becomes equal to or less than a preset threshold value, and uses a result of the optimization calculation as information indicating the coverage area.

In a second aspect, the coverage area calculator sets, upon starting the optimization calculation, the number of data processing apparatuses obtained by the previous optimization calculation as an initial value of the number of candidates for the data processing apparatus.

In a third aspect, the coverage area calculator alternately executes a first process of executing the optimization calculation by decreasing the number of candidates by a unit number and a second process of executing the optimization calculation by increasing the candidate number by a unit number, using the set initial value of the number of candidates as a starting point, stops the first process when the amount of processing load of the data processing apparatus has exceeded the threshold value in the first process, and stops the second process when the amount of processing load of the data processing apparatus has become equal to or less than the threshold value in the second process.

In a fourth aspect, the base station assignment controller sets, among the plurality of data processing apparatuses, a data processing apparatus that is in charge of data processing to an operation state and sets a data processing apparatus that is not in charge of data processing to an operation stop state, based on the calculated coverage area.

Moreover, according to the above-described embodiment, the following effects are achieved.

The coverage area calculator calculates, based on locations of a plurality of devices, arrangement positions and data processing capabilities of a plurality of data processing apparatuses, and arrangement positions of a plurality of base stations, an optimum range of a wireless communication area covered by the plurality of data processing apparatuses, and assigns, based on the calculated coverage area, a base station that is in charge of data processing to each of the data processing apparatuses.

Accordingly, even when movable devices such as sensors mounted on vehicles and portable terminals carried by persons are included in a plurality of devices, for example, and such devices move and their positions change, the coverage area of each of the data processing apparatuses, that is, the assignment of the base stations for which each of the data processing apparatuses is in charge of processing of their data is automatically updated in real time, in such a manner that the coverage area of each data processing apparatus becomes optimum on a moment-to-moment basis according to the change in the positions of the devices. As a result, it becomes possible to constantly maintain the number of devices for which each data processing apparatus is in charge of processing of their data at an optimum number, thereby preventing concentration of the processing load on some of the data processing apparatuses and improving the operation reliability of the entire system. Moreover, the necessity for the system administrator to manually perform an operation of monitoring the processing load of each of the data processing apparatuses to resolve the concentration of the processing load is eliminated, thus greatly reducing the operation cost of the system.

Furthermore, when calculating the optimum coverage area of each of the data processing apparatuses, an optimization calculation for obtaining an optimum number of data processing apparatuses and an optimum number of base stations that are assigned to the data processing apparatuses is performed, while changing the number of candidates for a data processing apparatus that performs data processing. As a result, it becomes possible to calculate an optimum number of data processing apparatuses and an optimum number of base stations that are allocated to each data processing apparatus according to the location of each of the devices on a moment-to-moment basis.

Furthermore, the optimization calculation is started using the number of data processing apparatuses obtained by the previous optimization calculation as an initial value. Generally, there is rarely a rapid change in the position of the device in a short period of time, and there is rarely a rapid change in the optimum number of data processing apparatuses in a short period of time. Accordingly, by setting the initial value of the number of candidates for the data processing apparatus at the time of performing the optimization calculation to the number of data processing apparatuses obtained by the previous optimization calculation, it is possible to reduce the number of repetitions of the optimization calculation and shorten the time required until the optimum coverage area of the data processing apparatus is obtained, thereby further improving the real-time properties of the optimization control.

In addition, when the optimization calculation is performed by setting the initial value of the number of candidates for the data processing apparatus to the number of data processing apparatuses obtained by the previous optimization calculation, a first process of performing an optimization calculation by decreasing the number of candidates and a second process of performing an optimization calculation by increasing the number of candidates are alternately performed. Therefore, no matter whether the number of optimum data processing apparatuses has decreased or increased since the previous optimization calculation, the probability that the optimum number of data processing apparatuses can be calculated in a short period of time can be increased.

Furthermore, the operations of the data processing apparatuses other than the optimum number of data processing apparatuses obtained by the optimization calculation are stopped. It is thereby possible to optimize the amount of the power consumption by the data processing apparatus as a system.

Therefore, according to the present embodiment, when data transmitted from a plurality of devices is processed by a plurality of servers in a shared manner, it is possible to provide a technique that enables constantly stable data processing even when the devices move.

While certain embodiments have been described, these embodiments have been presented by way of example only, and are not intended to limit the scope of the inventions. Indeed, the novel embodiments described herein may be embodied in a variety of other forms. Furthermore, various omissions, additions, and changes in the form of the embodiments described herein may be made without departing from the spirit of the invention. The accompanying claims and their equivalents are intended to cover such forms or modifications as would fall within the scope and spirit of the inventions.

REFERENCE SIGNS LIST

CS: Coverage area control apparatus
SV1 and SV2: servers
BS1 to BS5: base stations
E1 to E5: wireless communication areas
NW: Network
TM: Management terminal
1: Control unit
2: Memorizing unit
3: Interface unit
11: Server and base station management unit
12: Device position information acquisition unit
13: Coverage area calculator
14: Base station assignment controller
21: Server management information memory
22: Base station management information memory
23: Device position information memory
24: Base station assignment information memory
31: Terminal interface unit
32: Communication interface unit

The invention claimed is:

1. A coverage area control apparatus capable of controlling communications between a plurality of base stations each of which forms a wireless communication area and a plurality of data processing apparatuses, the apparatus comprising:
   one or more processors; and
   memory including instructions stored therein that, when executed by the one or more processors, perform to:
   manage first information and second information, the first information indicating arrangement positions and data processing capabilities of the data processing apparatuses that are geometrically dispersed and that receive data transmitted from a plurality of devices located in the wireless communication area via one of the base stations capable of communicating with the devices, the second information indicating arrangement positions of the base stations;
   acquire information indicating locations of the devices at a given timing;
   calculate a coverage area of a wireless communication area in which each of the data processing apparatuses is in charge of processing of the data, based on the information indicating the location, and the first information and the second information managed by the information management unit;
   assign a base station that is in charge of the processing of the data to each of the data processing apparatuses, based on the coverage area calculated by the coverage area calculator,
   wherein the calculation of the coverage area includes:
      performing, while changing the number of candidates for a data processing apparatus that performs the processing of the data, an optimization calculation for calculating the number of data processing apparatuses and the number of base stations that are assigned to the data processing apparatuses at which a communication distance between the data processing apparatus and the devices is minimized and an amount of a processing load of the data processing apparatus becomes equal to or less than a preset threshold value, and a result of the optimization calculation is used as information indicating the coverage area;
      setting, prior to starting the optimization calculation, the number of data processing apparatuses obtained by the previous optimization calculation as an initial value of the number of candidates for the data processing apparatus; and
      alternately executing a first process of executing the optimization calculation by decreasing the number of candidates by a unit number and a second process of executing the optimization calculation by increasing the candidate number by a unit number, using the set initial value of the number of candidates as a starting point, stopping the first process when the amount of the processing load of the data processing apparatus has exceeded a preset threshold value in the first process, and stopping the second process when the amount of the processing load of the data processing apparatus has become equal to or less than the threshold value in the second process.

2. The coverage area control apparatus according to claim 1, wherein the instructions when executed by the one or more processors, further perform to set, among the plurality of data processing apparatuses, a data processing apparatus that is in charge of processing of the data to an operation state and set a data processing apparatus that is not in charge of processing of the data to an operation stop state, based on the calculated coverage area.

3. A coverage area control method executed by an apparatus capable of controlling communications between a plurality of base stations each of which forms a wireless communication area and a plurality of data processing apparatuses, the method comprising:

acquiring information indicating locations of a plurality of devices located in the wireless communication area at a given timing;

calculating a coverage area of a wireless communication area in which each of the data processing apparatuses is in charge of processing of data transmitted from the devices, based on the information indicating the locations, first information and second information, the first information indicating arrangement positions and data processing capabilities of a plurality of data processing apparatuses that are geometrically dispersed and that receive the data via one of the base stations capable of communicating with the devices, the second information indicating arrangement positions of the base stations; and assigning a base station that is in charge of the processing of the data to each of the data processing apparatuses, based on the calculated coverage area, wherein the calculating the coverage area includes:

performing, while changing the number of candidates for a data processing apparatus that performs the processing of the data, an optimization calculation for calculating the number of data processing apparatuses and the number of base stations that are assigned to the data processing apparatuses at which a communication distance between the data processing apparatus and the devices is minimized and an amount of a processing load of the data processing apparatus becomes equal to or less than a preset threshold value, and a result of the optimization calculation is used as information indicating the coverage area;

setting, prior to starting the optimization calculation, the number of data processing apparatuses obtained by the previous optimization calculation as an initial value of the number of candidates for the data processing apparatus; and alternately executing a first process of executing the optimization calculation by decreasing the number of candidates by a unit number and a second process of executing the optimization calculation by increasing the candidate number by a unit number, using the set initial value of the number of candidates as a starting point, stopping the first process in response to a determination that the amount of the processing load of the data processing apparatus has exceeded a preset threshold value in the first process, and stopping the second process in response to a determination that the amount of the processing load of the data processing apparatus has become equal to or less than the threshold value in the second process.

4. The coverage area control method according to claim 3, further comprising setting, among the plurality of data processing apparatuses, a data processing apparatus that is in charge of processing of the data to an operation state and set a data processing apparatus that is not in charge of processing of the data to an operation stop state, based on the calculated coverage area.

5. A non-transitory computer readable medium storing a computer program which is executed by a computer to provide the steps of, the computer being for controlling communications between a plurality of base stations each of which forms a wireless communication area and a plurality of data processing apparatuses:

acquiring information indicating locations of a plurality of devices located in the wireless communication area at a given timing;

calculating a coverage area of a wireless communication area in which each of the data processing apparatuses is in charge of processing of data transmitted from the devices, based on the information indicating the locations, first information and second information, the first information indicating arrangement positions and data processing capabilities of a plurality of data processing apparatuses that are geometrically dispersed and that receive the data via one of the base stations capable of communicating with the devices, the second information indicating arrangement positions of the base stations; and assigning a base station that is in charge of the processing of the data to each of the data processing apparatuses, based on the calculated coverage area, wherein the calculating the coverage area includes:

performing, while changing the number of candidates for a data processing apparatus that performs the processing of the data, an optimization calculation for calculating the number of data processing apparatuses and the number of base stations that are assigned to the data processing apparatuses at which a communication distance between the data processing apparatus and the devices is minimized and an amount of a processing load of the data processing apparatus becomes equal to or less than a preset threshold value, and a result of the optimization calculation is used as information indicating the coverage area;

setting, prior to starting the optimization calculation, the number of data processing apparatuses obtained by the previous optimization calculation as an initial value of the number of candidates for the data processing apparatus; and alternately executing a first process of executing the optimization calculation by decreasing the number of candidates by a unit number and a second process of executing the optimization calculation by increasing the candidate number by a unit number, using the set initial value of the number of candidates as a starting point, stopping the first process when the amount of the processing load of the data processing apparatus has exceeded a preset threshold value in the first process, and stopping the second process when the amount of the processing load of the data processing apparatus has become equal to or less than the threshold value in the second process.

6. The non-transitory computer readable medium of claim 5 wherein the instructions further include instructions that when executed by the computer perform to set, among the plurality of data processing apparatuses, a data processing apparatus that is in charge of processing of the data to an operation state and set a data processing apparatus that is not in charge of processing of the data to an operation stop state, based on the calculated coverage area.

* * * * *